United States Patent [19]

Bock et al.

[11] Patent Number: 5,003,000

[45] Date of Patent: Mar. 26, 1991

[54] HYDROPHOBICALLY ASSOCIATING POLYMERS CONTAINING DIMETHYL ACRYLAMIDE FUNCTIONALITY

[75] Inventors: Jan Bock, Bridgewater; Paul L. Valint, Asbury, both of N.J.

[73] Assignee: Exxon Research & Engineering Company, Florham Park, N.J.

[21] Appl. No.: 545,169

[22] Filed: Jun. 28, 1990

Related U.S. Application Data

[60] Division of Ser. No. 484,755, Feb. 26, 1990, Pat. No. 4,981,935, which is a continuation of Ser. No. 291,729, Dec. 29, 1988, abandoned.

[51] Int. Cl.$^5$ ............................................. C08L 79/00
[52] U.S. Cl. ..................................................... 524/827
[58] Field of Search ................................. 524/817, 827

[56]  References Cited

U.S. PATENT DOCUMENTS

| | | | |
|---|---|---|---|
| 4,395,524 | 7/1983 | Emmons et al. | 526/307.2 |
| 4,417,992 | 11/1983 | Bhattacharyya et al. | 526/307.2 |
| 4,673,716 | 6/1987 | Siano et al. | 526/307.2 |
| 4,694,046 | 9/1987 | Bak et al. | 526/307.2 |
| 4,694,058 | 9/1987 | Siano et al. | 526/307.2 |
| 4,766,171 | 8/1988 | DeMartino | 524/827 |
| 4,882,405 | 11/1989 | Schulz et al. | 526/307.2 |

FOREIGN PATENT DOCUMENTS

| | | | |
|---|---|---|---|
| 0063018 | 10/1982 | European Pat. Off. | 526/307.2 |
| 49-124188 | 11/1974 | Japan | 524/827 |
| 55-133404 | 10/1980 | Japan | 524/827 |
| 60-168706 | 9/1985 | Japan | 526/307.2 |

*Primary Examiner*—Joseph L. Schofer
*Assistant Examiner*—N. Sarofin
*Attorney, Agent, or Firm*—Richard E. Nanfeldt

[57] ABSTRACT

This invention describes novel hydrophobically associating ter or tetra polymers which can contain sulfonate functionality which are useful as aqueous fluid rheology or flow modifiers. These high molecular weight water soluble polymers contain both water soluble and water insoluble monomers. The water soluble monomers are N, N dimethylacrylamide acrylamide (DMA) and optionally a salt of an ethylenically unsaturated sulfonic acid (s) or N-vinylpyrrolidinone or a metal acrylate and the water insoluble monomer is a higher alkyl acrylamide (R). The process for their preparation relies on solubilizing the water insoluble monomer into an aqueous micellar solution containing one or more surfactants and the water soluble monomers. The surfactants are specifically selected to enable homogeneous dispersion of the hydrophobic monomer(s) in the presence of anionic sulfonate containing monomers. Redox or free radical initiators are used to copolymerize both the water soluble and water insoluble monomers, forming terpolymers of dimethylacrylamide, alkylacrylamides and acrylamide, and optionally an anionic sulfonate or carboxylate monomer. Aqueous solutions of these hydrophobically associating polymers exhibit enhanced viscosification, reduced salt sensitivity and other desirable rheological properties found useful in a variety of applications.

2 Claims, No Drawings

HYDROPHOBICALLY ASSOCIATING POLYMERS CONTAINING DIMETHYL ACRYLAMIDE FUNCTIONALITY

This is a division of application Ser. No. 484,755, filed Feb. 26, 1990 now U.S. Pat. No. 4,981,935, which is a continuation of application Ser. No. 291,729, filed Dec. 29, 1988, now abandoned.

FIELD OF THE INVENTION

This invention relates to novel hydrophobically associating ter or tetra polymers of an oil soluble or hydrophobic monomer, a water soluble substituted acrylamide monomer and acrylamide and optionally a water soluble anionic monomer such as a metal carboxylate or metal sulfonate monomer or a nonionic water soluble monomer such as N-vinylpyrrolidinone. These polymers are useful as aqueous fluid rheology or flow modifiers in applications requiring enhanced hydrolytic and thermal stability. These high molecular weight water soluble polymers contain both water soluble and water insoluble monomers. The water soluble monomers are N, N-dimethylacrylamide (DMA), acrylamide (AM) and optionally a sulfonate monomer (S) such as 2-acrylamido - 2-methylpropane sulfonate or n-vinylpyrrolidinone (NVP) or a metal acrylate (H) and the water insoluble monomer is a higher alkyl acrylamide (R).

The process for the preparation of these hydrophobically associating ter and tetrapolymers relies on solubilizing the water insoluble monomer into an aqueous micellar solution containing one or more surfactants and the water soluble monomers. The surfactants are specifically selected to enable homogeneous dispersion of the hydrophobic monomer(s) in the presence of the water soluble monomers. Redox or free radical initiators are used to copolymerize both the water soluble and water insoluble monomers forming ter or tetra polymers of N-alkylacrylamide, N, N-dimethylacrylamide and acrylamide and optionally a water soluble anionic monomer. Aqueous solutions of these hydrophobically associating polymers exhibit enhanced viscosity, reduced salt sensitivity, improved hydrolytic stability and other desirable rheological properties found useful in a variety of applications.

DESCRIPTION OF THE PRIOR ART

Polyacrylamide (PAM) and partially hydrolyzed polyacrylamide (HPAM) are well known water soluble polymers used as flocculation aids for waste water treatment and dewatering sludge, and for rheology control for secondary or tertiary oil recovery. Further examples of the properties and use of these polymers can be found in *Handbook of Water Soluble Gums and Resins,* R. L. Davidson, Ed., McGraw Hill 1980, Chapter 16 by H. Volk and R. E. Friedrich or in *Water-Soluble Polymers,* N. M. Bikales. Ed., Plenum Press, 1973, by D. C. MacWilliams, J. H. Rogers and T. J. West.

Polyacrylamides rely on a combination of high molecular weight and chain expansion due to repulsion of pendent ionic groups along the polymer chain to viscosify or thicken aqueous fluids. However, high molecular weight polymers mechanically degrade when subjected to large elongational or shear stresses such as found in pumps or during injection into reservoir rocks. This degradation results in permanent reduction in polymer molecular weight and in turn loss of viscosification efficiency. The presence of cations in aqueous solution, in particular divalent cations, shields the ionic charged groups on the polymer This causes the polymer chains to collapse into a random coil type configuration, losing significant vis-cosification efficiency. Thus polymeric vis-cosifiers based on an alternative mechanism of viscosification providing improved mechanical stability and salt tolerance relative to PAM and HPAM polymers would be highly desirable.

Another problem with polyacrylamide based polymers is the susceptibility to hydrolysis of the amide linkage. This results in conversion of the nonionic amide functionality to a carboxylic acid or salt. When the amount of carboxylic acid or salt on the polymer is greater than about 40 mole %, divalent ions in the water can cause precipitation of the polymer. This precludes the use of these polymers as viscosifiers under conditions in which hydrolysis can occur. The use of these polymers at high temperature such as greater than 60 C. and in high pH or caustic conditions is thus limited.

Water soluble copolymers of acrylamide and sulfonated monomers have been studied as aqueous fluid viscosifiers. For example, C. L. McCormick and G. S. Chen, J. of Polymer Science Polymer Chemistry Ed., Vol. 20, 817-838 (1982) describe the synthesis and characterization of random copolymers of acrylamide and sulfonated monomers such as sodium-2-sulfoethyl methacrylate or sodium-2-acrylamido-2-methylpropane sulfonate. In a recent paper on the dilute solution properties of these polymers, H. H. Neidlinger, G. S. Chen and C. L. McCormick, J. of Applied Polymer Science, Vol. 29, 713-730 (1984) noted the high salt sensitivity of these polymers, particularly for copolymer compositions containing more than about 25 mole percent sulfonate monomer. U.S. Pat. No. 4,342,653 teaches the use of random copolymers of acrylamide and AMPS for the flocculation of suspended solids in such aqueous systems as phosphate slime, uranium acid leach residue, etc.

Processes for preparing polyacrylamides are well known in the art; Tanaka et al., U.S. Pat. No. 4,154,910 teaches an aqueous solution method using the heat of polymerization to concentrate the product. Zimmermann et al., U.S. Pat. No. 3,211,708 teaches an oil-in-water bead polymerization for polymerizing water soluble monomers. These techniques result in moderate molecular weight polymers exhibiting poor viscosification efficiency particularly in saline solutions. Kolodny, U.S. Pat. No. 3,002,960 teaches a low temperature, redox initiated solution polymerization resulting in high molecular weight polyacrylamide. Another approach to high molecular weight water soluble polymers is described by J. W. Vanderhoff et al., U.S. Pat. No. 3,284,393, where water soluble monomers are polymerized at high concentration in a water-in-oil emulsion. While some of these processes allow high molecular weight polymers to be prepared, the resulting polyacrylamide, PAM, and partially hydrolyzed polyacrylamide, HPAM, and copolymers of acrylamide and sulfonated monomer, SAM, systems provide only fair viscosification efficiency, poor mechanical stability and low salt tolerance.

One approach to overcoming the deficiencies in these polyacrylamide based systems is described by Bock et al., U.S. Pat. No. 4,520,182. Water soluble acrylamide copolymers containing a small amount of oil soluble or hydrophobic alkyl acrylamide groups were found to impart efficient viscosification to aqueous fluids. Furthermore since these alkyl acrylamide- acrylamide copolymers (RAM) were nonionic, they were relatively insensitive to the level of salt in the water. However, these polymers required concentrations above about 2000 ppm to provide significant viscosification. Landoll, U.S. Pat. No. 4,304,902 describes copolymers of ethylene oxide with long chain epoxides which also required relatively large polymer concentration (approx. 1%) for thickening water and required surfactants for solubility due to irregularities in the polymerization. In a related case, U.S. Pat. No. 4,428,277, modified nonionic cellulose ether polymers are described. Although these polymers show enhanced viscosification relative to polymers not containing hydrophobic groups, the viscosification efficiency was very low requiring 2 to 3 weight percent polymer to provide an enhancement. The use of surfactants to enable solubility and in turn viscosification by a water soluble polymer containing hydrophobic groups is described by Evani, U.S. Pat. No. 4,432,881. The hydrophobic groups claimed are attached to the polymer via an acrylate linkage which is known to have poor hydrolytic stability. In addition, the need for a surfactant to achieve solubility and thickening efficiency should make such a system very salt sensitive as well as very sensitive to small changes in surfactant and polymer concentration. Emmons et al. U.S. Pat. No. 4,395,524 teaches acrylamide copolymers as thickeners for aqueous systems. While these polymers possess hydrophobic groups, they are prepared using alcohol containing solvents which are known chain transfer agents. The resulting polymers have rather low molecular weights and thus relatively high polymer concentrations are required to achieve reasonable viscosification of water based fluids.

One of the objects of this invention is to overcome the deficiencies in the use of the water soluble polymers of the prior art for thickening aqueous fluids. A new class of water soluble polymers will be described which impart enhanced viscosification to aqueous fluids, improved mechanical and thermal or hydrolytic stability and better salt tolerance. These new polymers contain N, N dimethylacrylamide, a nonionic water soluble monomer such as acrylamide, optionally, 2-acrylamido-2-methylpropane sulfonate or N-vinylpyrrolidinone or a metal acrylate and a water insoluble or hydrophobic monomer such as an alkyl acrylamide with a chain length of six carbons or greater. When these polymers are placed in an aqueous solvent, the hydrophobic groups aggregate or associate in a manner similar to a surfactant. This hydrophobic association between polymer chains in solution results in an increase in the hydrodynamic size of the molecule which in turn causes an increase in viscosity. We have found that the presence of ionic groups, such as sodium 2-acrylamido-2-methylpropane sulfonate, AMPS, cause an expansion of the polymer in solution, an improvement in polymer solubility and a favorable interaction with the hydrophobic groups. The replacement of acrylamide with N,N dimethylacrylamide, significantly improves the thermal and hydrolytic stability of these polymers This improved stability enables the use of these polymers at high temperature, for longer periods of time and under high pH conditions. Thus polymers containing water soluble alkyl substituted acrylamides, sulfonate groups and hydrophobic groups provide a significant improvement in viscosification efficiency and thermal or hydrolytic stability of water based systems.

Synthesis of the hydrophobically associating polymers of the instant invention presents difficulties. In order for polymerization to be effected, the monomers must obviously come into close proximity to one another. The incompatibility of the oil soluble and water soluble monomers prevents an effective concentration of one or the other of these monomeric species from being achieved at the locus of polymerization of the other comonomer. Thus one objective of this invention is to teach a method for preparing the novel substituted acryalmide (e.g. dimethylacrylamide) containing hydrophobically associating polymers. A variety of processes based upon prior art could conceivably achieve this, but have serious deficiencies, necessitating the instant invention. For example, simply dispersing the water insoluble monomer as fine particles in the aqueous medium containing dissolved water soluble monomers would result in low incorporation of the water insoluble monomer and would lead to a heterogeneous product of particles dispersed in a predominantly water soluble polymer. The resulting polymer could not be used to impart efficient and uniform thickening to water based fluids.

Techniques for polymerizing water soluble polymers such as those taught in U.S. Pat. Nos. 4,154,190; 3,211,708; 3,002,960 and 3,284,393 cannot be used to prepare the compositions of this invention. This art does not teach the formation of a sufficiently fine dispersion of the water and oil soluble monomers to enable uniform reaction and efficient aqueous viscosifiers to be prepared. The use of mutual solvents or solvent mixtures to dissolve the water and oil soluble monomers as taught by Lenke et al., U.S. Pat. No. 4,151,333 and Barua et al., U.S. Pat. No. 4,098,987 has some serious limitations. Although this approach undoubtedly allows the incompatible monomers to come into close proximity to one another, since the dispersion is on a molecular scale, often the resulting copolymer is insoluble in the same solvent as shown in U.S. Pat. No. 4,151,333. This leads to precipitation of the copolymer before it has achieved sufficient molecular weight to provide efficient aqueous viscosification. The use of water miscible solvents such as alcohols, ether and acetone either alone or with water as taught in U.S. Pat. No. 4,098,987 results in extremely low molecular weight (e.g. 10,000) polymers due to the high chain transfer characteristics of these solvents. Thus polymers produced by these teachings are rather ineffective viscosifiers for aqueous fluids.

Two techniques have been found most useful for preparing hydrophobically associating copolymers of acrylamide and alkyl acrylamides The first method was based on the use of a water continuous microemulsion to disperse the oil soluble monomer in a solution of the water soluble monomers. Details of the procedures and techniques are taught by Turner et al. in U.S. Pat. No. 4,521,580. A second method for preparing copolymers of acrylamide and alkylacrylamide was based on dispersing the oil soluble monomers using an aqueous micellar solution of the water soluble monomers. Suitable surfactants and the details of the polymerization are taught by Turner et al. in U.S. Pat. No. 4,528,348. A micellar polymerization technique can be used to prepare hydrophobically associating polymers containing a variety of water soluble nonionic monomers. However, a problem arises when the monomers have a strong interaction with the surfactants used in the polymerization. In particular, strong ionic interactions or complexes can be formed between anionic water soluble monomers such as ethylenically unsaturated alkyl sulfonates and cationic surfactants such as quaternary alkyl amines. Bock et al. in U.S. Pat. No. 4,730,028 describe a means of overcoming these deficiencies. The process taught in these patents are incorporated herein by reference.

SUMMARY OF THE INVENTION

This invention describes novel hydrophobically associating ter or tetra polymer compositions optionally containing sulfonate monomers. The polymers consist of a water soluble nonionic monomer such as acrylamide and dimethylacrylamide, optionally a water soluble anionic sulfonate monomer such as sodium 2-acrylamido-2-methylpropane sulfonate or a carboxylate monomer such as a metal acrylate and an oil soluble hydrophobic alkylacrylamide monomer. These ter or tetra polymers provide efficient viscosification of water or brine solutions. The anionic sulfonate groups improve polymer solubility in water and brine, particularly in the presence of salts containing divalent cations, and impart some chain stiffness due to charge repulsion, particularly in water containing a low electrolyte concentration. The hydrophobic N-alkylacrylamide groups associate in solution to create a structure with an apparent increase in molecular weight resulting in enhanced thickening efficiency. Thus the anionic sulfonate groups and hydrophobic groups are balanced to provide water and brine solubility along with excellent thickening efficiency. In addition, aqueous fluids thickened with the polymer compositions of this invention, have improved mechanical stability, when subjected to high shear, and better salt tolerance relative to polymers relying on molecular weight in place of the hydrophobic associations for viscosification.

The replacement of acrylamide with the water soluble nonionic monomers, DMA and NVP, renders the resulting copolymers more hydrolytically stable. It is well known in the art that as the nitrogen atom of a monomeric amide is increasingly substituted from a primary to tertiary amide, the amide becomes more resistant to hydrolysis. Since both DMA and NVP are tertiary amides, the incorporation of these monomers into a polymer at the expense of the primary amide, acrylamide, should increase the hydrolytic stability of the polymer.

For the possible application of fluid mobility control in porous media, such as oil reservoir formations, anionic functionality along the polymer molecular chain is a requirement in order to minimize polymer adsorption on the rock surfaces. Since the surfaces of typical porous media are anionically charged, the presence of anionic functionality on the polymer molecules reduces adsorption by an electrostatic repulsion mechanism. Therefore, various anionic monomers are included in the instant polymer compositions in the form of sulfonate containing monomers such as AMPS and carboxylate monomers such as metal acrylates. One method of incorporating acrylate functionality into these polymers is by copolymerization with an appropriate metal acrylate derivative of acrylic acid. Alternately, such anionic functionality can be introduced by postpolymerization hydrolysis of a portion of the acrylamide content of the polymer.

DETAILED DESCRIPTION OF THE INVENTION

The present invention describes novel ter or tetra polymers consisting of N, N-dimethylacrylamide, nonionic, water soluble, ethylenically unsaturated monomer, such as acrylamide; optionally a water soluble, anionic, ethylenically unsaturated alkylsulfonate monomer, such as salts of 2 TM acrylamido-2-methylpropane sulfonic acid, or a metal acrylate or N-vinylpyrrolidinone; and a water insoluble monomer, such as an alkylacrylamide. The resulting ter or tetra polymers are efficient viscosifiers of water and brine. The water soluble hydrophobically associating polymers of the instant invention are characterized by the formula:

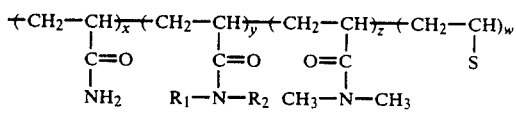

wherein S is $SO_3M$, phenyl $SO_3M$, $CONHC(CH_3)_2CH_2SO_3M$, or $COOM$; $R_1$ is hydrogen, a $C_1$ to $C_{10}$ alkyl, cycloalkyl or aralkyl group; $R_2$ is a $C_4$ to $C_{18}$ alkyl, cycloalkyl or aralkyl group; x is about 10 mole percent to about 90 mole percent; y is about 0.1 mole percent to about 10 mole percent, and z is about 10 to about 50 mole percent and w is about 0 to about 50 mole percent and M is a metal cation selected from the group consisting of Groups IA, IIA, IB or IIB of the Periodic Table of Elements. Typical, but nonlimiting examples of preferred cations are sodium, potassium and ammonium. The mole percentage of acrylamide, x, is preferably about 20 to about 80, more preferably about 30 to about 80, and most preferably about 30 to about 70. The mole percentage of the salt of the sulfonic or carboxylic acid containing monomer, w, is preferably about 0 to about 40, more preferably about 5 to about 35, and most preferably about 10 to about 30. The mole percentage of the hydrophobic group, y, is preferably about 0.1 to about 10, more preferably about 0.2 to about 5 and most preferably about 0.2 to about 3.0 The mole % of the N, N-dimethylacrylamide is about 5 to about 45, more preferably about 10 to about 40 and most preferably about 15 to about 40 mole percent.

The molecular weight of the water soluble ter or tetra polymers of this invention is sufficiently high that they are efficient viscosifiers of water or brine, but not so high that the polymer molecules are readily susceptible to irreversible shear degradation. Thus the weight average molecular weights are preferably about 200,000 to about 10 million, more preferably about 500,000 to about 8 million and most preferably about 1 million to about 7 million. The intrinsic viscosity of these polymers as measured in 2 % sodium chloride solution is preferably greater than about 2 g/dl.

The novel hydrophobically associating ter or tetra polymers of this invention are prepared by a novel micellar free radical polymerization process more fully described in U.S. Pat. No. 4,730,028 and copending application case No. Ser. No. 291,803, filed Dec. 28, 1988, now U.S. Pat. No. 4,963,632, incorporated herein by reference. The process comprises the steps of forming a micellar surfactant solution of the oil soluble or hydrophobic alkyl acrylamide in an aqueous solution of the water soluble monomers of acrylamide, N,N dimethylacrylamide, and optionally an ethylenically unsaturated sulfonate or carboxylate monomer; deaerating this solution by purging with nitrogen or additionally applying a vacuum; raising the temperature to the desired reaction temperature; adding sufficient free radical initiator to the reaction solution; and polymerizing for a sufficient period of time at a sufficient temperature to effect polymerization. The resulting terpolymer of N, N-dimethylacrylamide, acrylamide, a salt of an ethylenically unsaturated alkyl or aryl sulfonic acid or carboxylic acid and a hydrophobic N-alkylacrylamide can be isolated from the reaction mixture by any of a variety of techniques which are well know to one skilled in the art. For example, the polymer may be recovered by precipitation using a nonsolvent such as acetone, methanol, isopropanol or mixtures thereof. The precipitated polymer can then be washed and oven dried to provide a product in the form of a free flowing powder. Alternatively the polymer solution may be used as is by diluting with the desired aqueous solvent to the concentration of use.

The process for synthesizing these ter or tetra polymers relies on solubilizing the water insoluble monomer into a predominantly aqueous media by the use of a suitable water soluble surfactant, such as sodium dodecyl sulfate. When mixed with an aqueous solution of the water soluble N, N-dimethylacrylamide, acrylamide monomer and the sulfonate or carboxylate monomer, the surfactant solution can disperse the water insoluble monomer on an extremely fine scale so that the reaction mixture is isotropic, clear, and homogeneous. These micellar reaction mixtures are free of visible oil droplets or particulates of the water insoluble monomer. The ter or tetra polymerization can, therefore, be initiated by water soluble initiators to yield ter or tetra polymers which are substantially free of visible particulates. The resultant reaction mixture remains homogeneous throughout the course of the reaction without the need for agitation with external mixers or stirrers.

Micelles formed by the surfactant which solubilize the water insoluble monomer are generally small aggreagates which consist of about 50 to 200 molecules. They may assume a variety of shapes from spherical to rod-like or cylindrical and generally are in the size range from about 20 Angstoms to 500 Angstroms in diameter. These micelles form spontaneously upon mixing the components together, i.e., they do not require the vigorous mixing conditions required in conventional emulsion polymerization in which macroemulsions are formed. The macroemulsion droplets of the conventional emulsion polymerization process have diameters which are at least 10,000 Angstroms. They therefore tend to phase separate upon standing, leading to undesirable inhomogeneities in the produced copolymer. The homogeneous micellar reaction mixture is, on the other hand, much more stable against demixing than the formulations used in emulsion polymerization processes. Indeed, no stirring is required during the course of the micellar copolymerization. The micellar aggregates remain extremely finely dispersed throughout. Moreover, the finely dispersed nature of the micellar aggregates permit the terpolymerization to occur in such a way that a water soluble terpolymer is produced which does not contain particulates or latexes of water insoluble polymers. These would be detrimental in such applications as secondary oil recovery, which requires a product which is substantially free of pore plugging particulates.

The surfactants which may be used in this process may be one of the water soluble surfactants such as salts of alkyl sulfates, sulfonates and carboxylates or alkyl arene sulfates, sulfonates or carboxylates. Prefered are sodium or potassium salts of decyl sulfate, dodecyl sulfate or tetradecylsulfate. For these ionic surfactants, the Krafft point, which is the defined as the minimum temperature for micelle formation, must be below the temperature used for the polymerization. Thus at the conditions of polymerization, the desired surfactant will form micelles which solubilize the water insoluble monomer. Nonionic surfactants can also be used for preparing the polymers of this invention. For example ethoxylated alcohols, ethoxylated alkyl phenols, ethoxylated dialkyl phenols, ethylene oxide-propylene oxide copolymers and polyoxyethylene alkyl ethers and esters can be used. Prefered nonionic surfactants are ethoxylated nonyl phenol with 5 to 20 ethylene oxide units per molecule, ethoxylated dinonyl phenol containing 5 to 40 ethylene oxide units per molecule and ethoxylated octyl phenol with 5 to 15 ethylene oxide units per molecule. Surfactants which contain both nonionic and anionic functionality, e.g. sulfates and sulfonates of ethoxylated alcohols and alkyl phenols can also be used. Combinations of anionic and nonionic surfactants can also be used as long as the surfactants solubilize the hydrophobic monomer into an aqueous phase containing the water soluble monomers. The surfactant or mixtures of surfactants will be used at concentrations above their critical micelle concentration and preferably at concentrations such that only one hydrophobic monomer is associated with a surfactant micelle. Thus the actual concentration of surfactant for a given polymerization will depend on the concentration of oil soluble or hydrophobic monomers employed.

Polymerization of the water soluble and water insoluble monomers is effected in an aqueous micellar solution containing a suitable free radical initiator. Examples of suitable water soluble free radical initiators include peroxides such as hydrogen peroxide and persulfates such as sodium, potassium or ammonium persulfate. The concentration of the free radical initiator is about 0.01 to about 0.5 grams per hundred grams of total monomers. Suitable oil soluble initiators are organic peroxides and azo compounds such as azobisisobutyronitrile. Water soluble initiators are prefered such as potassium persulfate. Redox initiation involving an oxidant such as potassium persulfate and a reductant such as sodium metabisulfite can also be used to initiate polymerization, particularly at low temperatures. Polymerizing at lower temperature results in the formation of higher molecular weight polymers which are desirable from the standpoint of efficient aqueous viscosification. Typically it is desired to employ from about 0.01 to about 0.5 weight percent of initiator based on the weight of monomers. The polymerization temperature is preferably about 0 C. to about 90 C., more preferably about 20 C. to about 80 C. and most preferably about 25 C. to about 70 C.

The hydrophobically associating ter or tetra polymer compositions produced by the micellar polymerization process of this invention have been found useful for thickening aqueous fluids. To prepare these thickened fluids, an amount of the ter or terta polymer thickening agent is dissolved in the aqueous fluid by agitation using any of a number of techniques well known in the art. For example a marine impeller operating at relatively low speed can be used to first disperse and then dissolve these hydrophobically associating terpolymers. It is desirable to use relatively low agitation conditions since these polymers have a tendency to cause and stabilize foams which can be difficult to break. The aqueous solutions may be distilled water, high concentrations of electrolyte in water such as in hard water or brine.

Monovalent inorganic salts such as sodium chloride and divalent salts such as calcium or magnesium chloride or sulfate can be present in the brine in substantial amounts. A preferred method for preparing the thickened brine solutions involves first preparing a concentrated solution of the polymer in relatively fresh water and then adding a concentrated brine solution to obtain the desired final thickened brine solution. The amount of polymeric thickening agent needed to produce a desired level of viscosification will depend on the composition of the electrolytes in the aqueous fluid and the temperature. In general, more polymer will be required as the electrolyte concentration increases and as the temperature increases. Viscosification of about 2 to about 100 times or more that of the neat solvent can readily be achieved with the terpolymer and tetrapolymers of this invention. Preferably about 0.01 to about 2.0 weight percent, more preferably about 0.05 to about 1.0 weight percent and most preferably about 0.1 to about 0.5 weight percent polymer based on the aqueous medium will provide the desired level of thickening efficiency.

The thickening efficiency of a given polymer is influenced by the amount of anionically charged sulfonate groups, the level and type of hydrophobic groups and the weight average molecular weight. The addition of the anionic sulfonate groups improves polymer solubility and enhances thickening efficiency due to repulsion of charges along the backbone which tends to open the polymer coil and increase hydrodynamic volume. The hydrophobic groups decrease polymer solubility and associate in solution to physically bridge polymer molecules creating greater resistance for flow and hence increased viscosity. The more insoluble the hydrophobic group is in the solvent, the less that is needed to create the associations in solution. For example, less dodecylacrylamide is needed in a polymer to create the same viscosification as a larger amount of octyl acrylamide in a similar polymer. In addition it is possible to have too much association, in which case the polymer becomes insoluble in the solvent and cannot be used as a viscosifier. Fortunately, the solubility characteristics of the sulfonate and hydrophobic groups are opposite one another and thus the addition of more sulfonate monomer can be used to counterbalance the addition of hydrophobic groups. Increasing both sulfonate and hydrophobic groups can result in a synergistic enhancement of thickening efficiency.

Molecular weight of the polymer is also an important consideration. High molecular weight polymers incorporating both anionically charged sulfonate groups and hydrophobic groups can provide significantly improved viscosification of water based fluids. All other things being equal, the higher the molecular weight, the less soluble the polymer. Thus as molecular weight is increased, the amount of hydrophobic groups should be reduced and the amount of sulfonate groups increased. It is desirable that the resulting polymer in an aqueous solution not be susceptible to irreversible mechanical degradation under shear. This places an upper limit on the molecular weight of about 0 million. Control of molecular weight is achieved by the concentration of monomers, the type and level of initiator and the reaction temperature. As is well known in the art, the molecular weight is increased by increasing the monomers level and decreasing the initiator level and reaction temperature.

To evaluate and characterize the unique and useful properties of the hydrophobically associating polymers of this invention, dilute solution viscometric measurements were made. These measurements are particularly useful for evaluating the effect of composition and polymerization process conditions on the dyrodynamic size of the polymer in solution and the influence of associating groups. The hydrodynamic size is measured by the intrinsic viscosity which is proportional to the viscosity average polymer molecular weight. To determine the intrinsic viscosity, the reduced viscosity is first evaluated at several polymer concentrations in the dilute regime. The reduced viscosity is defined as the incremental viscosity increase of the polymer solution relative to the pure solvent normalized with respect to the pure solvent viscosity and the polymer concentration. A plot of reduced viscosity versus polymer concentration should yield a straight line at low polymer concentrations. The intercept of this reduced viscosity plot at zero polymer concentration is defined as the intrinsic viscosity while the slope is the Huggins interaction coefficient times the square of the intrinsic viscosity. The Huggins constant is a measure of polymer-solvent interactions. For hydrophobically associating polymers, it is characterisitically greater than the 0.3 to 0.7 value normally observed for nonassociating polymers such as polyacrylamides.

Measurement of the dilute solution viscosity can be made with conventional Couette or capillary viscometers. A set of Ubbelohde capillary viscometers were used in this study and shear rate effects were found to be negligible in the concentration range of interest. However, since the terpolymers contain anionically charged groups, a polyelectrolyte effect was observed in dilute solution. This polyelectrolyte effect resulted in an increase in reduced viscosity with decreasing polymer concentration and tended to mask the effect of hydrophobic associations. The addition of salts such as sodium chloride or sodium sulphate shields the charge repulsion causing the polyelectrolyte effect and resulted in the desired linear reduced viscosity-concentration profile. The dilute solution measurements were thus made on solutions containing 2.0 weight percent sodium chloride.

The solution viscosity of associating polymers in the semi-dilute concentration regime is dramatically different than conventional water soluble polymers. Viscosities of these solutions were measured by means of a Contraves low shear viscometer, model LS 30, using a No. 1 cup and No. 1 bob. Temperatures were controlled to +0.1 C. and measurements were made at a variety of rotational speeds corresponding to shear rates from about 1.0 sec$^{-1}$ to about 100 sec$^{-1}$. In contrast to conventional water soluble polymers and relatively low molecular weight weakly associating polymers, the terpolymers of this invention can exhibit significant relaxation times which result in slow equilibration. To determine steady state viscosity values at a given stress or shear rate, relatively long measurement times were employed. This effect is most evident at higher polymer concentrations, higher polymer molecular weights and in regions of strong intermolecular hydrophobic associations.

DESCRIPTION OF THE PREFERED EMBODIMENTS

The following examples illustrate the present invention without, however, limiting the same hereto.

A number of polymers containing N-octylacrylamide, acrylamide and DMA were prepared with compositions described in Table 1. These polymers were synthesized according to the typical procedure described in Example I.

Sodium acrylate functionality was incorporated into the N,N dimethylacrylamide, DMA, containing polymers via two routes to give DMA—HRAM polymers containing DMA, sodium acrylate (H), a hydrophobic alkylacrylamide monomer (R), and acrylamide (AM). A portion of the polymerization reaction mixture was partially hydrolyzed with NaOH after polymerization was complete. The hydrolysis conditions of NaOH concentration, temperature and reaction time were chosen to give a desired level of sodium acrylate content in the hydrolyzed polymer. Typical results of acrylate content as a function of NaOH concentration and temperature and the detailed hydrolysis procedure are given in Example II. The alternate synthetic route to DMA-HRAM polymers is copolymerization of the appropriate monomers according to the typical procedure given in Example III. The range of compositional variation of the copolymers containing N-octylacrylamide, acrylamide, DMA and sodium acrylate is represented by the polymer samples summarized in Table I.

Additional replacement of acrylamide was achieved with the use of sodium 2-acrylamido-2 methylpropane sulfonate monomer to give poly (N-octylacrylamide-c-DMA-c-acrylamide-c-sodium acrylamido-2-methylpropane sulfonate). The typical procedure to synthesize such polymers is presented in Example IV. Hydrolysis of these compositions with NaOH results in further replacement of acrylamide monomer units by conversion of the acrylamide to sodium acrylate units. The typical procedure to prepare these copolymers is given in Example V. The compositions containing hydrophobic monomer, DMA, AMPS, acrylamide and sodium acrylate are presented in Table II.

TABLE I

Synthesis and compositional parameters for DMA-HRAM Polymers.

| Exp. No., V— | $C_8AM$ mol % | DMA mol % | Acrylate From | Acrylate mol % | Acrylamide mol % | Total Monomer wt % | SDS wt % | Persulfate $[M] \times 10^{-4}$ | Bisulfite $[M] \times 10^{-4}$ | Conversion % |
|---|---|---|---|---|---|---|---|---|---|---|
| 7591a | 0.75 | 20 |  | 0.0 | 79.25 | 4.5 | 3.00 | 1.4 | 1.4 | 65.2 |
| 75.91B | 0.75 | 20 | hydrol. | 7.6 | 79.25 | 4.5 | 3.00 | 1.4 | 1.4 | 60.8 |
| 7592a | 0.75 | 30 |  | 0.0 | 69.25 | 4.5 | 3.00 | 1.3 | 1.3 | 48.6 |
| 7592b | 0.75 | 30 | hydrol. | 5.2 | 69.25 | 4.5 | 3.00 | 1.3 | 1.3 | 51.2 |
| 7593a | 0.75 | 40 |  | 0.0 | 59.25 | 4.5 | 3.0 | 1.2 | 1.2 | 34.2 |
| 7593b | 0.75 | 40 | hydrol. | 18.5 | 59.25 | 4.5 | 3.00 | 1.2 | 1.2 | 65.6 |
| 75.99a | 0.75 | 40 |  | 0.0 | 59.25 | 6.0 | 3.00 | 1.2 | 1.2 | 42.2 |
| 7599b | 0.75 | 40 | hydrol. | 14.3 | 59.25 | 6.0 | 3.00 | 1.2 | 1.2 | 66.8 |
| 7608a | 0.75 | 40 |  | 0.0 | 59.25 | 6.0 | 2.00 | 1.2 | 1.2 | 77.9 |
| 7608b | 0.75 | 40 | hydrol. | 31.6 | 59.25 | 6.0 | 2.00 | 1.2 | 1.2 | 93.3 |
| 7609a | 0.75 | 40 |  | 0.0 | 59.25 | 6.0 | 2.50 | 1.2 | 1.2 | 73.7 |
| 7609b | 0.75 | 40 | hydrol. | 24.9 | 59.25 | 6.0 | 2.50 | 1.2 | 1.2 | 100.0 |
| 7623 | 1.00 | 40 | hydrol. | 10.6 | 59.00 | 6.0 | 2.50 | 1.1 | 1.1 | 72.0 |
| 7624 | 0.75 | 40 | hydrol. | 11.1 | 59.25 | 6.0 | 1.50 | 1.2 | 1.2 | 73.6 |
| 7625 | 1.0 | 40 | hydrol. | 9.9 | 59.00 | 6.0 | 2.00 | 1.1 | 1.1 | 68.9 |
| 7647 | 0.75 | 40 | hydrol. | 14.4 | 59.25 | 6.0 | 1.25 | 1.2 | 1.2 | 82.4 |
| 7649 | 0.75 | 40 | hydrol. | 13.6 | 59.25 | 6.0 | 1.50 | 1.2 | 1.2 | 85.6 |
| 7654 | 0.75 | 40 | copolym. | 15.0 | 44.25 | 6.0 | 1.50 | 1.1 | 1.1 | 62.0 |
| 7656 | 0.75 | 40 | copolym. | 5.0 | 54.25 | 6.0 | 1.50 | 1.2 | 1.2 | 78.9 |
| 7657 | 0.75 | 40 | copolym. | 10.0 | 49.25 | 6.0 | 1.50 | 1.2 | 1.2 | 80.9 |
| 7664 | 0.75 | 40 | copolym. | 15.0 | 44.25 | 6.0 | 1.50 | 1.1 | 1.1 | 62.6 |
| 7665 | 0.75 | 40 | copolym. | 15.0 | 44.25 | 6.0 | 3a | 1.1 | 1.1 | 58.8 |
| 7666 | 0.75 | 40 | copolym. | 15.0 | 44.25 | 6.0 | 3.00 | 1.1 | 1.1 | 70.1 |
| 7667 | 0.75 | 40 | copolym. | 15.0 | 44.25 | 6.0 | 2.25 | 1.1 | 1.1 | 60.6 |
| 7679 | 0.75 | 40 | copolym. | 20.0 | 39.25 | 6.0 | 1.50 | 1.0 | 1.0 | 69.1 |
| 7680 | 0.75 | 40 | copolym. | 25.0 | 34.25 | 6.0 | 1.50 | 1.0 | 1.0 | 63.7 |
| 7681 | 0.75 | 60 | hydrol. | 13.7 | 39.25 | 6.0 | 1.50 | 1.1 | 1.1 | 74.8 |
| 7699 | 0.75 | 60 | hydrol. | 15.4 | 39.25 | 6.0 | 1.25 | 1.1 | 1.1 | 73.9 |
| 7712 | 0.75 | 60 | hydrol. | 18.1 | 39.25 | 6.0 | 1.00 | 1.1 | 1.1 | 84.3 |
| 7742b | 0.75 | 60 | hydrol. | 20.0 | 39.25 | 9.0 | 3.00 | 0.9 | 0.9 | 64.2 | a. Igepal CO-710 surfactant

TABEL II

Synthesis and compositional parameters for DMA-AMPS polymers.

| Exp. No. V— | $C_8AM$ mol % | DMA mol % | AMPS mol % | Acrylate Type | Acrylate mol % | Acrylamide mol % | Total Monomer wt % | SDS wt % | Persulfate $[M] \times 10^{-5}$ | Bisulfite $[M] \times 10^{-5}$ | Conversion % |
|---|---|---|---|---|---|---|---|---|---|---|---|
| 7415 | 1.25 | 20 | 20 |  | 0.0 | 58.75 | 4.5 | 3.00 | 7.2 | 7.1 | 64.5 |
| 7418 | 0.75 | 20 | 20 |  | 0.0 | 59.25 | 4.5 | 3.00 | 7.1 | 7.1 | 67.7 |
| 7419 | 1.00 | 20 | 20 |  | 0.0 | 59.00 | 4.5 | 3.00 | 7.1 | 7.1 | 67.4 |
| 7430 | 1.00 | 30 | 30 |  | 0.0 | 39.00 | 4.5 | 3.00 | 5.5 | 5.5 | 86.8 |
| 7431 | 1.00 | 20 | 30 |  | 0.0 | 49.00 | 4.5 | 3.00 | 5.6 | 5.6 | 85.5 |
| 7510 | 0.75 | 20 | 20 |  | 0.0 | 59.25 | 6.0 | 3.00 | 7.1 | 7.1 | 83.1 |
| 7511 | 0.75 | 20 | 20 |  | 0.0 | 59.25 | 9.0 | 3.00 | 7.1 | 7.1 | 75.4 |
| 7524 | 0.75 | 20 | 20 |  | 0.0 | 59.25 | 9.0 | 3a | 7.3 | 7.3 | 69.0 |
| 7655 | 0.75 | 40 | 5 |  | 0.0 | 54.25 | 6.0 | 1.50 | 10.2 | 10.2 | 71.8 |
| 7658 | 0.75 | 40 | 10 |  | 0.0 | 49.25 | 6.0 | 1.50 | 8.6 | 8.6 | 77.8 |
| 7661 | 0.75 | 40 | 10 |  | 0.0 | 49.25 | 6.0 | 3.00 | 8.6 | 8.6 | 70.8 |
| 7662 | 0.75 | 40 | 15 |  | 0.0 | 44.25 | 6.0 | 3.00 | 7.3 | 7.3 | 68.6 |
| 7669 | 0.75 | 40 | 15 |  | 0.0 | 44.25 | 6.0 | 3a | 7.3 | 7.3 | 76.9 |

TABEL II-continued

Synthesis and compositional parameters for DMA-AMPS polymers.

| Exp. No. V— | C₈AM mol % | DMA mol % | AMPS mol % | Acrylate Type | Acrylate mol % | Acrylamide mol % | Total Monomer wt % | SDS wt % | Initiator Conc. Pensulfate [M] × 10 − 5 | Initiator Conc. Bisulfite [M] × 10 − 5 | Conversion % |
|---|---|---|---|---|---|---|---|---|---|---|---|
| 7671 | 0.75 | 40 | 25 | | 0.0 | 34.25 | 6.0 | 3a | 5.6 | 5.6 | 84.0 |
| 7673 | 0.75 | 40 | 25 | | 0.0 | 34.25 | 6.0 | 2.00 | 5.6 | 5.6 | 67.7 |
| 7674 | 0.75 | 40 | 25 | | 0.0 | 34.25 | 6.0 | 4.00 | 5.6 | 5.6 | 67.3 |
| 7677 | 0.75 | 40 | 25 | | 0.0 | 34.25 | 6.0 | 2.00 | 16.7 | 16.7 | 83.0 |
| 7678 | 0.75 | 60 | 10 | | 0.0 | 29.25 | 6.0 | 2.00 | 7.7 | 7.7 | 82.3 |
| 7682 | 0.75 | 60 | 10 | | 0.0 | 29.25 | 6.0 | 1.50 | 7.7 | 7.7 | 77.6 |
| 7740b | 0.75 | 60 | 5 | hydrol. | 14.7 | 34.25 | 6.0 | 1.25 | 9 | 9 | 53.6 |
| 7741a | 0.75 | 60 | 5 | | 0.0 | 34.25 | 6.0 | 2.00 | 9 | 9 | 100.0 |
| 7741b | 0.75 | 60 | 5 | hydrol. | 17.5 | 34.25 | 6.0 | 2.00 | 9 | 9 | 60.6 |
| 7742b | 0.75 | 60 | 5 | | 0.0 | 34.25 | 9.0 | 3.00 | 9 | 9 | 100.0 |
| 7743a | 0.50 | 60 | 5 | | 0.0 | 34.50 | 6.0 | 1.25 | 9 | 9 | 82.5 |
| 7743b | 0.50 | 60 | 5 | hydrol. | 14.4 | 34.50 | 6.0 | 1.25 | 9 | 9 | 46.2 |
| 7744a | 0.75 | 60 | 5 | | 0.0 | 34.25 | 6.0 | 1.00 | 9 | 9 | 100.0 |
| 7744b | 0.75 | 60 | 5 | hydrol. | 16.1 | 34.25 | 6.0 | 1.00 | 9 | 9 | 57.1 |
| 7745a | 0.75 | 60 | 5 | | 0.0 | 34.25 | 6.0 | 1.50 | 9 | 9 | 100.0 |
| 7745b | 0.75 | 60 | 5 | hydrol. | 15.0 | 34.25 | 6.0 | 1.50 | 9 | 9 | 44.4 |
| 7746a | 0.75 | 60 | 10 | | 0.0 | 29.25 | 6.0 | 1.75 | 7.7 | 7.7 | 100.0 |
| 7746b | 0.75 | 60 | 10 | hydrol. | 8.6 | 29.25 | 6.0 | 1.75 | 7.7 | 7.7 | 50.4 |
| 7747a | 0.75 | 60 | 15 | | 0.0 | 24.25 | 6.0 | 1.75 | 6.6 | 6.6 | 100.0 |
| 7747b | 0.75 | 60 | 15 | hydrol | 5.7 | 24.25 | 6.0 | 1.75 | 6.6 | 6.6 | 51.9 |
| 7748a | 0.75 | 60 | 10 | | 0.0 | 29.25 | 6.0 | 1.00 | 7.7 | 7.7 | 72.5 |
| 7748b | 0.75 | 60 | 10 | hydrol. | 11.2 | 29.25 | 6.0 | 1.00 | 7.7 | 7.7 | 56.7 |
| 7750a | 0.75 | 60 | 15 | | 0.0 | 24.25 | 6.0 | 1.00 | 6.6 | 6.6 | 98.8 |
| 7750b | 0.75 | 60 | 15 | hydrol. | 6.8 | 24.25 | 6.0 | 1.00 | 6.6 | 6.6 | 45.8 |
| 7751a | 0.75 | 60 | 15 | | 0.0 | 24.25 | 6.0 | 1.50 | 6.6 | 6.6 | 100.0 |
| 7751b | 0.75 | 60 | 15 | hydrol. | 6.3 | 24.25 | 6.0 | 1.50 | 6.6 | 6.6 | 44.6 |
| 7752a | 0.75 | 60 | 10 | | 0.0 | 29.25 | 6.0 | 1.50 | 7.7 | 7.7 | 99.5 |
| 7752b | 0.75 | 60 | 10 | hydrol. | 11.4 | 29.25 | 6.0 | 1.50 | 7.7 | 7.7 | 49.5 |
| 7753a | 0.75 | 60 | 10 | | 0.0 | 29.25 | 6.0 | 2.00 | 7.7 | 7.7 | 99.2 |
| 7753b | 0.75 | 60 | 10 | hydrol. | 15.0 | 29.25 | 6.0 | 2.00 | 7.7 | 7.7 | 52.6 |
| 779a | 0.75 | 40 | 20 | | 0.0 | 39.25 | 6.0 | 2.00 | 6.4 | 6.4 | 88.8 |
| 779b | 0.75 | 40 | 20 | hydrol. | 10.3 | 39.25 | 6.0 | 2.00 | 6.4 | 6.4 | 63.1 |
| 7780a | 0.75 | 40 | 40 | | 0.0 | 19.25 | 6.0 | 2.00 | 3.9 | 3.9 | 100.0 |
| 7780b | 0.75 | 40 | 40 | hydrol. | 0.0 | 19.25 | 6.0 | 2.00 | 3.9 | 3.9 | 39.8 |
| 7843 | 0.75 | 20 | 40 | | 0.0 | 39.25 | 6.0 | 3.00 | 4.2 | 4.2 | 73.1 |
| 7844 | 0.75 | 40 | 40 | | 0.0 | 19.25 | 6.0 | 3.00 | 3.9 | 3.9 | 68.0 | a Igepal CO-710 surfactant.

Additional copolymer compositions were prepared which contained N-vinyl-pyrrolidinone (NVP) along with N-octylacrylamide, DMA and acrylamide. These polymers were synthesized as shown in Example VI. Hydrolysis of the compositions represented by Example VI further decreased the content of acrylamide by replacement with sodium acrylate as shown in Example VII. This procedure, in addition to replacing acrylamide, provided anionic functionality in the polymer in the form of the acylate monomer. An alternate approach to an anionic polymer composition was to copolymerize with AMPS monomer as shown in Example VIII. All of the polymer compositions containing NVP are given in Table III.

TABLE III

Synthesis and compositional parameters for DMA-NVP-AMPS polymers.

| Exp. No., V— | C₈AM mol % | DMA mol % | NVP mol % | Acrylate From | Acrylate mol % | AMPS mol % | Acrylamide mol % | Total Monomer wt % | SDS wt % | Initiator VA-044 [M] × 10 − 4 | Conversion % |
|---|---|---|---|---|---|---|---|---|---|---|---|
| 8016a | 0.75 | 50 | 10 | | 0.0 | | 39.25 | 20 | 2.00 | 12.0 | 99.0 |
| 8016b | 0.75 | 50 | 10 | hydrol. | 6.9 | 0 | 39.25 | 20 | 2.00 | 12.0 | 71.8 |
| 8017a | 0.75 | 50 | 10 | | 0.0 | 0 | 39.25 | 20 | 1.25 | 12.0 | 100.0 |
| 8017b | 0.75 | 50 | 10 | hydrol. | 7.1 | 0 | 39.25 | 20 | 1.25 | 12.0 | 77.4 |
| 8025a | 0.50 | 30 | 30 | | 0.0 | 0 | 39.50 | 20 | 1.00 | 11.0 | 92.6 |
| 8025b | 0.50 | 30 | 30 | hydrol. | 6.8 | 0 | 39.50 | 20 | 1.00 | 11.0 | 85.6 |
| 8029 | 0.75 | 20 | 20 | | 0.0 | 30 | 29.25 | 20 | 1.00 | 5.4 | 100.0 |
| 8032 | 0.50 | 20 | 20 | | 0.0 | 30 | 29.50 | 20 | 1.00 | 5.4 | 100.0 |
| 8036 | 0.50 | 20 | 30 | | 0.0 | 20 | 29.50 | 20 | 1.00 | 6.5 | 93.7 |
| 8037 | 0.50 | 30 | 30 | copolym. | 15.0 | 0 | 24.50 | 20 | 1.00 | 10.0 | 100.0 |
| 8044 | 0.25 | 20 | 30 | | 0.0 | 20 | 29.75 | 20 | 1.00 | 6.5 | 72.1 |
| 8045 | 0.50 | 20 | 30 | | 0.0 | 20 | 29.50 | 20 | 1.25 | 6.5 | 97.1 |
| 8052 | 0.50 | 20 | 20 | | 0.0 | 30 | 29.50 | 20 | 2.00 | 5.4 | 100.0 |
| 8053 | 0.25 | 20 | 20 | | 0.0 | 30 | 29.75 | 20 | 0.50 | 5.4 | 100.0 |
| 8058 | 0.50 | 20 | 30 | | 0.0 | 20 | 29.50 | 20 | 2.00 | 6.5 | 100.0 |
| 8059 | 0.25 | 20 | 30 | | 0.0 | 20 | 29.75 | 20 | 0.50 | 6.5 | 100.0 |
| 8065 | 0.5A | 20 | 20 | | 0.0 | 30 | 30.00 | 20 | 2.00 | 5.3 | 66.9 |
| 8066 | 0.5b | 20 | 20 | | 0.0 | 30 | 30.00 | 20 | 2.00 | 5.4 | 100.0 |
| 8068 | 0.50 | 20 | 20 | | 0.0 | 30 | 29.50 | 30 | 2.00 | 12.0 | 100.0 |

TABLE III-continued

Synthesis and compositional parameters for DMA-NVP-AMPS polymers.

| Exp. No., V— | C$_8$AM mol % | DMA mol % | NVP mol % | Acrylate From | Acrylate mol % | AMPS mol % | Acrylamide mol % | Total Monomer wt % | SDS wt % | Initiator VA-044 [M] × 10 − 4 | Conversion % |
|---|---|---|---|---|---|---|---|---|---|---|---|
| 8069 | 0.75 | 20 | 20 | | 0.0 | 30 | 29.25 | 30 | 2.00 | 12.0 | 100.0 | a. N-Hexadecylacrylamide
b. 2-Acrylamido-2-methyl-4,4-dimethylhexane.

The aqueous solution properties of the copolymers were examined according to the procedures described in Example X. It was observed that small amounts of hydrophobic monomer incorporated into the water soluble polymer backbone had pronounced effects on the solution properties of the polymers as characterized by their viscosity in salt given in Table IV. It can be seen that in all cases the addition of hydrophobic monomer to a comparable water soluble polymer significantly increases the solution viscosity.

EXAMPLE I

Redox Polymerization of N-Octylacrylamide-Acrylamide-DMA

A solution was prepared of 15 g of sodium dodecylsulfate in 500 mL of deoxygenated water. N-1-octylacrylamide, 0.496 g, was dissolved in this solution followed by 15.2 g of acrylamide and 14.31 g of DMA. The resulting solution was carefully transferred to a 1 L Morton style resin kettle fitted with a chilled water condenser, thermometer, inert gas sparger and mechanical stirrer. The temperature was adjusted to 20 C. and polymerization was initiated by the addition of 0.0165 g of potassium persulfate, K$_2$S$_2$O$_8$, and 0.0116 g of sodium bisulfite, Na$_2$S$_2$O$_5$. After stirring for 22 hr at 20 ±0.2 C., a 333 mL portion of the viscous solution was poured slowly into 3 L of acetone. The precipitated polymer was then masticated in a Waring blender with acetone, filtered and dried under vacuum at 30 C. The yield of polymer was 8.43 g. A similar procedure was used to prepare the polymers illustrated in Table I.

EXAMPLE II

Preparation of Poly(N-1-octylacrylamide-c-acrylamide-c-DMA-c-sodium acrylate)

NaOH, 3.86 g of 50% solution, was added to the remainder of the polymer solution of Example I. and the resulting solution was stirred for two hrs. at 60 C. The solution was then poured slowly into 3 L of acetone and the precipitated polymer was then masticated in a Waring blender with acetone, filtered and dried under vacuum at 30 C. The yield of hydrolyzed polymer was 6.68 g. This polymer contained about 14 mole percent sodium acrylate groups as determined by sodium analysis and titration.

EXAMPLE III

Copolymerization of N-1-Octylacrylamide, Acrylamide. DMA and Sodium Acrylate

A solution containing 15 g of sodium dodecylsulfate in 500 mL of deoxygenated water was prepared. N-1-octylacrylamide, 0.476 g, was dissolved in this solution followed by 10.9 g of acrylamide, 13.73 g of DMA and 2.87 g of acrylic acid. The acrylic acid was neutralized with 3.19 g of 50% NaOH solution. The resulting solution was carefully transferred to a 1 L Morton style resin kettle fitted with a chilled water condenser, thermometer, inert gas sparger and mechanical stirrer. The temperature was adjusted to 25 C. and polymerization was initiated by the addition of 0.0163g of potassium persulfate, K$_2$S$_2$O$_8$, and 0.0107 g of sodium bisulfite, Na$_2$S$_2$O$_5$. After stirring for 16 hr at 25 ±0.2 C., the viscous solution was poured slowly into 3 L of acetone. The precipitated polymer was then masticated in a Waring blender with acetone, filtered and dried under vacuum at 30 C. The yield of polymer was 21.75 g (72.5 %). Table I illustrates examples of other compositions of these DMA-HRAM polymers prepared in a similar manner.

EXAMPLE IV

Preparation of Poly(N-1-octylacrylamide-c-acrylamide-c-DMA-c-sodium acrylamido-2-methylpropane sulfonate)

A solution was prepared of 6.25 g of sodium dodecylsulfate in 500 mL of deoxygenated water. N-1-octylacrylamide, 0.426 g, was dissolved in this solution followed by 7.56 g of acrylamide, 18.46 g of DMA and 3.56 g of sodium acrylamido-2-methylpropane sulfonate. The resulting solution was carefully transferred to a 1 L Morton style resin kettle fitted with a chilled water condenser, thermometer, inert gas sparger and mechanical stirrer. The temperature was adjusted to 25 C. and polymerization was initiated by the addition of 0.0163g of potasium persulfate, K$_2$S$_2$O$_8$, and 0.0107 g of sodium bisulfite, Na$_2$S$_2$O$_5$. After stirring for 16 hr at 25 ±0.2 C., a 100 mL portion of the viscous solution was poured slowly into 3 L of 1:2 methanol:acetone. The precipitated polymer was then masticated in a Waring blender with methanol/acetone, filtered and dried under vacuum at 30 C. The yield of polymer was 4.04 g. Other hydrophobically associating polymers containing both DMA and AMPS are illustrated in Table II.

EXAMPLE V

Preparation of Poly(N-1-octylacrylamide-c-acrylamide-c-DMA-c-sodium acrylamido-2-methylpropane sulfonate-c-sodium acrylate)

NaOH, 48.18 g of 50% solution diluted with 250 mL of methanol, was added to the remainder of the polymer solution of Example IV. and the resulting solution was stirred for three hrs. at 60 C. The solution was then poured slowly into 3 L of 1:2 methanol:acetone and the precipitated polymer was then masticated in a Waring blender with methanol/acetone, filtered and dried under vacuum at 30C. The yield of hydrolyzed polymer was 17.74 g.

EXAMPLE VI

Polymerization of N-1-Octylacrylamide-Acrylamide-DMA-N-Vinylpyrrolidinone

A solution was prepared of 3.0 g of sodium dodecylsulfate in 300 mL of deoxygenated water. N-1-octylacrylamide, 0.597 g, was dissolved in this solution followed by 18.30 g of acrylamide, 19.38 g of DMA and 21.73 g of N-vinylpyrrolidinone (NVP). The resulting solution was carefully transferred to a 1 L Morton style resin kettle fitted with a chilled water condenser, thermometer, inert gas sparger and mechanical stirrer. The temperature was adjusted to 25 C. and polymerization was initiated by the addition of 0.108 g of 2,2'-azobis(N,N'--dimethylene-isobutyramidine) dihydrochloride. After stirring for 16 hr at 25 ±0.2 C., a 250 mL portion of the viscous solution was added to 3 L of acetone. The precipitated polymer was then masticated in a Waring blender with methanol/acetone, filtered and dried under vacuum at 30 C. The yield of polymer was 55.53 g. Other examples of these polymers are given in Table III.

EXAMPLE VII

Preparation of Poly(N-1-octylacrylamide-c-acrylamide-c-DMA-c-N-vinylpyrrolidinone-c-sodium acrylate)

NaOH, 34.4 g of 50% solution diluted with 100 mL of water, was added to the remainder of the polymer solution of Example VI. and the resulting solution was stirred for three hrs. at 60 C. The solution was then poured slowly into 3 L of 1:2 methanol:acetone and the precipitated polymer was then masticated in a Waring blender with methanol/acetone, filtered and dried under vacuum at 30C. The yield of hydrolyzed polymer was 9.04 g. Other examples of these polymers are given in Table III.

EXAMPLE VIII

Polymerization of N-1-Octylacrylamide-Acrylamide-DMA-N-Vinylpyrrolidinone-Sodium Acrylamido-2-methylpropane sulfonate A solution was prepared of 6.0 g of sodium dodecylsulfate in 300 mL of deoxygenated water. N-1-octylacrylamide, 1.492 g, was dissolved in this solution followed by 13.98 g of acrylamide, 13.33 g of DMA, 14.94 g of N-vinylpyrrolidinone (NVP) and 41.81 g of sodium acrylamido-2-methylpropane sulfonate. The resulting solution was carefully transferred to a 1 L Morton style resin kettle fitted with a chilled water condenser, thermometer, inert gas sparger and mechanical stirrer. The temperature was adjusted to 25 C. and polymerization was initiated by the addition of 0.108 g of 2,2'-azobis(N,N'-dimethylene-isobutyramidine) dihydrochloride. After stirring for 16 hr at 25 ±0.2 C., a 250 mL portion of the viscous solution was added to 3 L of acetone. The precipitated polymer was then masticated in a Waring blender with methanol/acetone, filtered and dried under vacuum at 30 C. The yield of polymer was 110.04 g.

EXAMPLE IX

Polymerization of N-Hexadecylacrylamide-Acrylamide-DMA-N-Vinylpyrrolidinone-Sodium Acrylamido-2-methylpropane sulfonate A solution was prepared of 6.0 g of sodium dodecylsulfate in 300 mL of deoxygenated water. N-Hexadecylacrylamide, 0.666 g, was dissolved in this solution followed by 9.44 g of acrylamide, 8.92 g of DMA, 10.00 g of N-vinylpyrrolidinone (NVP) and 27.99 g of sodium acrylamido-2-methylpropane sulfonate. The resulting solution was carefully transferred to a 1 L Morton style resin kettle fitted with a chilled water condenser, thermometer, inert gas sparger and mechanical stirrer. The temperature was adjusted to 25 C. and polymerization was initiated by the addition of 0.0518 g of 2,2'-azobis(N,N'-dimethylene-isobutyramidine) dihydrochloride. After stirring for 16 hr at 25 ±0.2 C., a 250 mL portion of the viscous solution was added to 3 L of acetone. The precipitated polymer was then masticated in a Waring blendor with methanol/acetone, filtered and dried under vacuum at 30 C. The yield of polymer was 42.21 g.

EXAMPLE X

Polymerization of N-1,1,3,3-Tetramethylpentyl-acrylamide-Acrylamide-DMA-N-Vinylpyrrolidinone-Sodium Acrylamido-2-methylpropane sulfonate A solution was prepared of 6.0 g of sodium dodecylsulfate in 300 mL of deoxygenated water. N-Hexadecylacrylamide, 0.666 g, was dissolved in this solution followed by 9.44 g of acrylamide, 8.92 g of DMA, 10.00 g of N-vinylpyrrolidinone (NVP) and 27.99 g of sodium acrylamido-2-methylpropane sulfonate. The resulting solution was carefully transferred to a 1 L Morton style resin kettle fitted with a chilled water condenser, thermometer, inert gas sparger and mechanical stirrer. The temperature was adjusted to 25 C. and polymerization was initiated by the addition of 0.0518 g of 2,2'-azobis(N,N'-dimethylene-isobutyramidine) dihydrochloride. After stirring for 16 hr at 25 ±0.2 C., a 250 mL portion of the viscous solution was added to 3 L of acetone. The precipitated polymer was then masticated in a Waring blender with methanol/acetone, filtered and dried under vacuum at 30 C. The yield of polymer was 42.2I g.

EXAMPLE XI

Solution Viscometrics

Hydration of SRAM polymers was performed first at 2000 ppm concentration in purified water obtained from a Millipore "Milli-Q"system. Solution quality was determined visually and the viscosity was determined at several shear rates. This was followed by addition of a concentrated brine solution containing 12% NaCl and 1.2% $CaCl_2$. The final polymer concentration was 1500 ppm in 3.3% brine (3.0% NaCl and 0.3% $CaCl_2$). The rheological measurements were conducted using a Contraves LS-30 Rheometer as reflected in Table IV.

TABLE IV

Solution Viscosity of DMA containing polymers.

| Sample No., V— | Composition, mol % | | | | | viscosity[a] at 11 sec$^{-1}$ |
|---|---|---|---|---|---|---|
| | C$_8$AM | DMA | AMPS | NVP | NaACR | |
| 7653 | 0.0 | 40 | 0 | 0 | 16 | 7.1 |
| 7649 | 0.75 | 40 | 0 | 0 | 15 | 17 |
| 7732 | 0.0 | 60 | 0 | 0 | 21 | 6.4 |
| 7699 | 0.75 | 60 | 0 | 0 | 18 | 11 |
| 7827 | 0.0 | 40 | 20 | 0 | 0 | 5.4 |
| 7779a | 0.75 | 40 | 20 | 0 | 0 | 22.9 |
| 7828 | 0.0 | 40 | 40 | 0 | 0 | 5.4 |
| 7780a | 0.75 | 40 | 40 | 0 | 0 | 7.9 |
| 8021 | 0.0 | 30 | 0 | 30 | 15 | 3.7 |
| 8037 | 0.5 | 30 | 0 | 30 | 15 | 30.8 |
| 8028 | 0.0 | 20 | 30 | 20 | 0 | 5.8 |
| 8032 | 0.5 | 20 | 30 | 20 | 0 | 23.3 |

[a]polymer concentration = 1500 ppm.

What is claimed is:

1. A solution comprising about 0.01 to about 2.0 wt% of a terpolymer dissolved in 100 grams of water, wherein said terpolymer has the formula:

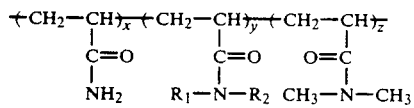

wherein R$_1$ is hydrogen, a C$_1$ to C$_{10}$ alkyl, cycloalkyl or aralkyl group; R$_2$ is a C$_4$ to C$_{18}$ alkyl, cycloalkyl or aralkyl group; x is about 10 mole percent to about 90 mole percent; y is about 0.1 to about 10 mole percent; and z is about 10 to about 50 mole percent.

2. A solution according to claim 1 wherein said water has about 0.5 to about 20 grams of a salt per 100 grams of water dissolved therein.

* * * * *